Sept. 23, 1969        J. F. M. G. LADMIRANT        3,468,438
                      SILO FOR BULK MATERIAL
Filed Sept. 19, 1967                              2 Sheets-Sheet 2

United States Patent Office 3,468,438
Patented Sept. 23, 1969

3,468,438
SILO FOR BULK MATERIAL
Jean Florent Marie Ghislain Ladmirant, Zetrud-Lumay, Belgium, assignor to A-B-R Ateliers Belges Reunis S.A., Petit-Enghien, Belgium, a Belgian company
Filed Sept. 19, 1967, Ser. No. 668,774
Claims priority, application Belgium, Sept. 20, 1966, 33,564
Int. Cl. A01f 25/16; B65g 65/30
U.S. Cl. 214—17                         2 Claims

ABSTRACT OF THE DISCLOSURE

There is provided a silo for bulk material having a central column for use in filling and emptying the silo, and having a spreading or feeding assembly for moving material stored in the silo, said assembly comprising an upper beam and a lower beam which are rotatably mounted on said column and extending diametrally of the silo, the lower beam being height-adjustable, cable and pulley systems connecting the lower beam to the upper beam and adapted and arranged so that they may effect height-adjustment of the lower beam and so that, when the upper beam is rotated, the lower beam is also rotated and lies substantially at an angle of 90° to the upper beam, and means on the lower beam for effecting movement of material outwardly away from or inwardly towards the central column dependent upon the direction of rotation of the beams.

---

Figure 1:
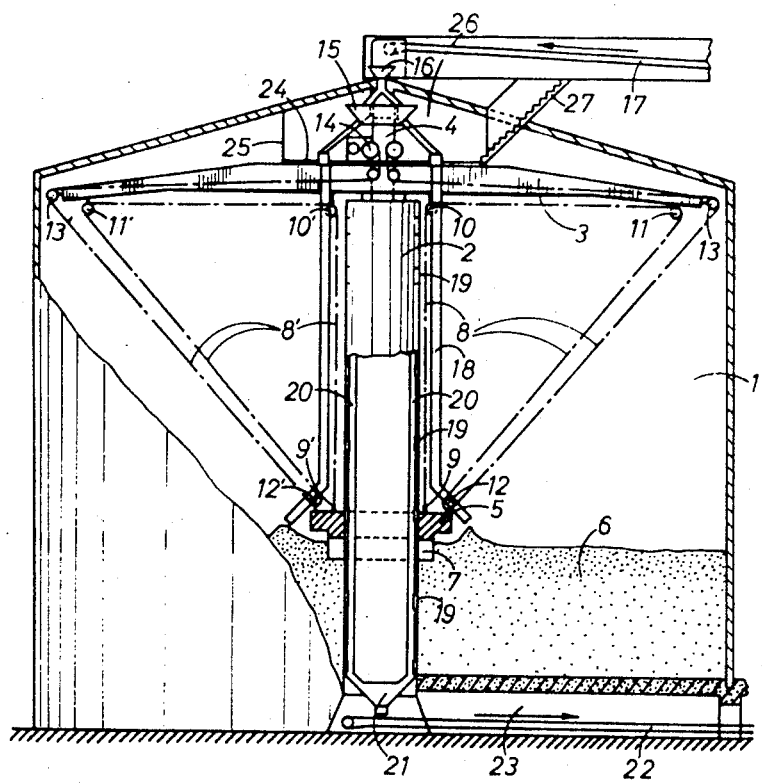

This invention relates to silos for bulk material such as salts, fertilizers, minerals, sugar, cereals and the like.

Silos are known which are of a cylindrical or polygonic shape, and which are provided with a central column for use in filling or emptying the silo, and a spreading or feeding assembly for radially moving material stored in the silo, either to level out the material during filling of the silo, or to bring the goods material toward the central column when emptying the silo, or to facilitate drying and avoid solidification. The spreading or feeding assembly comprises, for example, a crossbar rotatably guided on rails laid in a circle in the silo around the central column and a spreading or feeding device suspended therefrom by cables, so that the device may rotate with the cross-bar and may be lowered onto the surface of the stored material. The said device may be in the form of a worm or belt conveyor which may be reversible.

Such an assembly has various disadvantages, among which are the following: The suspension of the said device by cables results in its exerting, relative to the cross-bar, a drag which increases as the device descends further into the silo. Because of this, the device, instead of extending radially, deviates from this position, and its inner end becomes spaced from the central column, so that the device carries out one of its functions poorly, i.e., bringing stored material towards the column which has windows at different levels, through which the material to be removed from the silo passes, and is discharged at the foot of the column by a conveyor belt. Moreover, the presence of a worm or belt conveyor necessitates the presence of a drive motor. The motor is exposed to dust contained in the material and raised by the conveyor, and, in some cases, there is risk of explosion of the dust, which can be brought about by sparks emanating from the motor or from faulty cabling supplying the motor, the interior of the silo being inaccessible to inspection for long periods. Also, if one wishes to be able to change the direction of movement of the stored material, this change can be carried out only by reversing the conveyor, as it would be impossbile to reverse the direction of feed of the goods by reversing the direction of rotation of the cross-bar. In any case, if this were done, there would be a considerable temporary loss of drive between the cross-bar and the device before the latter could regain its position, which would always be other than radial.

According to the present invention there is provided a silo for bulk material having a central column for use in filling and emptying the silo, and having a spreading or feeding assembly for moving material stored in the silo, said assembly comprising an upper beam and a lower beam which are rotatably mounted on said column and extending diametrally of the silo, the lower beam being height-adjustable, cable and pulley systems connecting the lower beam to the upper beam and adapted and arranged so that they may effect height-adjustment of the lower beam and so that, when the upper beam is rotated, the lower beam is also rotated and lies substantially at an angle of 90° to the upper beam, and means on the lower beam for effecting movement of material outwardly away from or inwardly towards the central column dependent upon the direction of rotation of the beams.

The accompanying diagrammatic drawings show, by way of example, one embodiment of the invention which will now be described.

Figure 2:
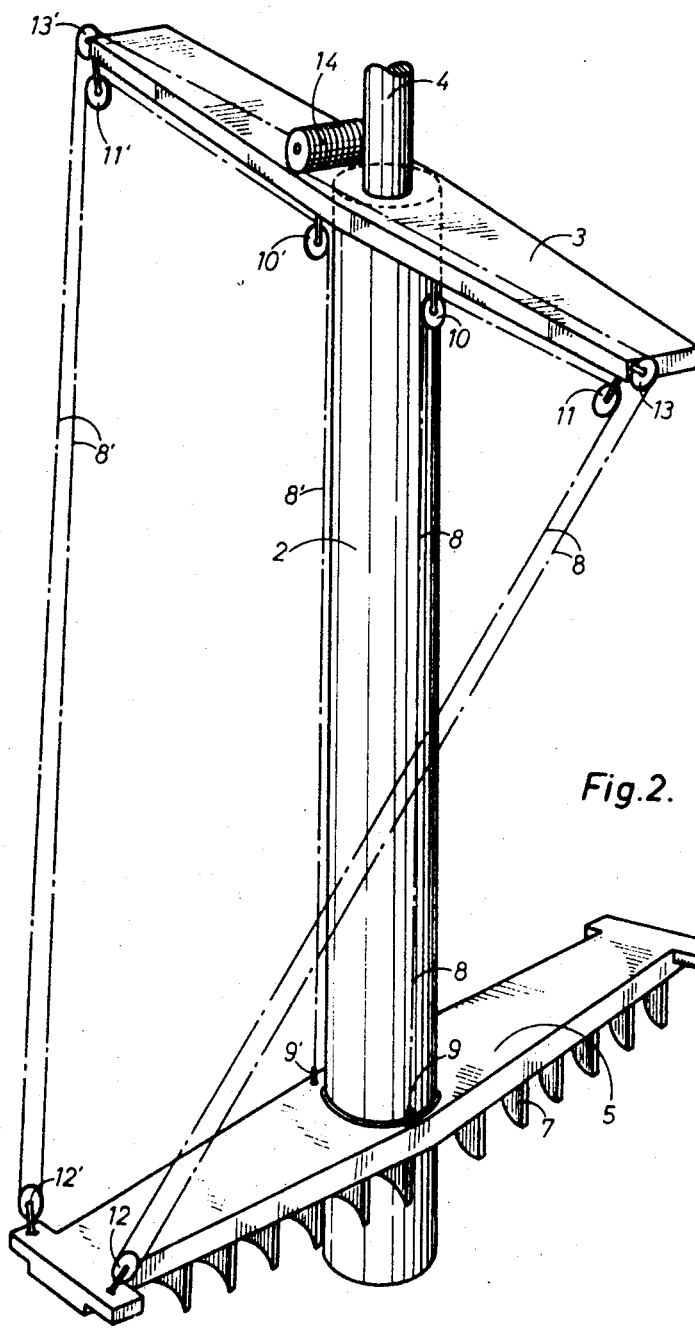

In the drawings,

FIG. 1 shows a silo according to the invention partly in elevation and partly in section, and FIG. 2 is a perspective view on an enlarged scale showing the spreading or feeding assembly.

A silo 1 has a central column 2 supporting at its upper end, a horizontal beam 3 which extends diametrally of the silo 1 and is slowly rotated, by means, not shown, around a fixed vertical shaft 4 centered in the column 2.

A lower horizontal diametrally extending beam 5 capable of turning around the central column 2 is linked to the upper beam 3 so that it can be rotated by the latter and be lowered onto material in the silo 1, while remaining constantly perpendicular to the upper beam 3. The lower beam 5 is provided on its underside with fixed and vertical spaced fins 7, projecting downwardly therefrom into the material 6 so as to move the material radially, either towards the outer periphery of the silo 1 to level the surface of the goods, or towards the central column 2 to discharge the material from the silo 1.

A connection between the beams 3 and 5 is effected by cables. Each cable has a vertical run which effects direct suspension of the lower beam 5, and vertical adjustment of the latter, with an invariable tractive effort at any level of the beam 5, and inclined runs serving to brace the lower beam 5 on the upper beam 3 in order to hold beams 3 and 5 mutually perpendicular. The level of the lower beam 5 may, alternatively, be modified solely by means of the inclined runs of the cables, but the tractive effort to be exerted on the cables increases greatly as the lower beam 5 approaches the upper beam, and would necessitate more powerful motors for the cable winches, and thicker cables.

The cables are in two pairs, and FIG. 2 shows the layout of one of said pairs, consisting of cables 8 and 8'. Respectively, the cables 8 and 8' are hooked, at 9 and 9' near the central column 2, to the lower beam 5, rise vertically along the column 2 to the upper beam 3, where they pass over pulleys 10, 10' and run along the arms of the beam 3 towards and over pulleys 11, 11' at opposite ends of the beam 3. The cables 8, 8' then descend towards return pulleys 12, 12' located at one of the ends (advantageously a little widened as shown) of the lower beam 5, and rise again towards pulleys 13, 13' at opposed ends of the upper beam 3, from which they pass to a winch 14 mounted on the beam 3, for winding or unwinding identical lengths of the cables 8 and 8'. The other pair of cables are similarly arranged. As already stated, this layout of the cables ensures easy vertical adjustment of the lower beam 5 as well as bracing of the latter relative to the upper beam 3. The beams 3, 5, the pairs of cables, the pulleys and the fins 7 thus form a spreading or feeding assembly, and the beam 5 and fins 7 form a spreading or feeding device.

The upper beam 3 supports and carries with it a circular hopper 15 which is rotatable on the shaft 4. This hopper 15 is designed to receive, through a fixed distributor 16, the material to be stored in the silo 1. The material is supplied, for example, by a conveyor 17, the material being delivered in a known way into the interior of the silo 1, at the level of the material already stored, by means of telescopic pipes 18. During filling of the silo 1, the beams 3 and 5 rotate in such a direction that the fins 7 move the material delivered by the pipes 18 towards the outer periphery of the silo 1, in order to level off the stored material.

In order to empty the silo, the direction of rotation of the beams 3, 5 is reversed, so that the material is moved towards the central column 2 and the windows 19 opening into vertical shafts 20 inside the column 2 above a hopper 21 provided at the foot of the column 2, whence the discharged material passes for example, as shown, on to a conveyor belt 22 installed below the silo 1 in a passageway 23, or may, alternatively, be taken up by an elevator (not shown) provided inside the central column 2, to the top of the silo 1, where it is fed by a conveyor belt, for example, to a bagging plant (not shown).

A rotary circular floor 24, surrounded by a fixed wall 25, can, advantageously, be mounted on the upper beam 2, so as to constitute a sealed enclosure 26 containing all the mechanical parts, such as the winches 14, means for moving the beams 3, 5, the motors and electrical plant. In this way, all these parts are easily accessible by a staircase 27, and are protected from dust so that danger of explosion inside the silo is prevented or considerably reduced.

I claim:
1. A silo for bulk material having a central column for use in filling and emptying the silo, and having a spreading and feeding assembly for moving material stored in the silo, said assembly comprising an upper beam and a lower beam which are rotatably mounted on said column and which extend diametrally of the silo, the lower beam being height-adjustable, a cable and pulley system connecting the lower beam to the upper beam and adapted and arranged to effect height-adjustment of the lower beam such that, when the upper beam is rotated, the lower beam is also rotated and lies at an angle of substantially 90° to the upper beam, said lower beam being connected to the upper beam by two pairs of cables comprising the cable and pulley system, each of the cables having an upright run extending along the central column and anchored at its lower end to the lower beam, and inclined runs between pulleys on the ends of the two beams, the individual cables of each pair of cables passing over pulleys on the same end of the lower beam and over pulleys on different ends of the upper beam, a winch on the upper beam to which the other ends of the pair of cables are connected, and means on the lower beam for effecting movement of material outwardly away from or inwardly towards the central column in accordance with the direction of rotation of the beams.

2. A silo as claimed in claim 1, in which the means for moving the stored material comprises fixed, spaced fins projecting downwardly from the lower beam.

References Cited

UNITED STATES PATENTS

| 2,649,215 | 8/1953 | Dickson | 214—17 |
| 3,358,856 | 12/1967 | Weibull | 214—17 |

FOREIGN PATENTS

| 180,518 | 8/1962 | Sweden. |

ROBERT G. SHERIDAN, Primary Examiner